United States Patent
Ito et al.

(10) Patent No.: US 10,415,201 B2
(45) Date of Patent: Sep. 17, 2019

(54) OPENING/CLOSING DEVICE

(71) Applicants: NIPPON KOEI CO., LTD., Tokyo (JP); TOKYO METROPOLITAN SEWERAGE SERVICE CORPORATION, Tokyo (JP); KANSEI COMPANY, Tokyo (JP)

(72) Inventors: Motonobu Ito, Saitama (JP); Tamotsu Kikuchi, Tokyo (JP); Takato Aoyama, Tochigi (JP); Takaaki Odate, Saitama (JP); Kenji Hasegawa, Tokyo (JP); Osamu Igawa, Tokyo (JP)

(73) Assignees: NIPPON KOEI CO., LTD., Tokyo (JP); TOKYO METROPOLITAN SEWERAGE SERVICE CORPORATION, Tokyo (JP); KANSEI COMPANY, Tokyo (JP)

( * ) Notice: Subject to any disclaimer, the term of this patent is extended or adjusted under 35 U.S.C. 154(b) by 189 days.

(21) Appl. No.: 15/572,623

(22) PCT Filed: Jun. 18, 2015

(86) PCT No.: PCT/JP2015/067647
§ 371 (c)(1),
(2) Date: Nov. 8, 2017

(87) PCT Pub. No.: WO2016/194237
PCT Pub. Date: Dec. 8, 2016

(65) Prior Publication Data
US 2018/0135266 A1    May 17, 2018

(30) Foreign Application Priority Data
Jun. 5, 2015 (JP) .................. 2015-114450

(51) Int. Cl.
*E02B 7/42* (2006.01)
*F16K 33/00* (2006.01)
(Continued)

(52) U.S. Cl.
CPC .............. *E02B 7/205* (2013.01); *E02B 7/40* (2013.01); *E02B 7/42* (2013.01); *E02B 7/44* (2013.01);
(Continued)

(58) Field of Classification Search
CPC ....... E03F 7/00; E03F 7/02; E03F 9/00; E03F 9/007; E02B 7/40; E02B 7/42;
(Continued)

(56) References Cited

U.S. PATENT DOCUMENTS 8,695,628 B2 * 4/2014 Komatsu ............... E03F 9/007
137/423
2011/0290343 A1 12/2011 Komatsu et al.
2011/0297250 A1 12/2011 Komatsu et al.

FOREIGN PATENT DOCUMENTS

DE    10320308 B3 *   6/2004 ............... E03F 9/00
EP    1411172         4/2004
(Continued)

OTHER PUBLICATIONS

Official Communication issued in European Patent Office (EPO) Patent Application No. 15894270.6, dated Mar. 18, 2019.
(Continued)

*Primary Examiner* — Mary E McManmon
*Assistant Examiner* — Hailey K. Do
(74) *Attorney, Agent, or Firm* — Greenblum & Bernstein, P.L.C.

(57) ABSTRACT

An opening/closing device according to the present invention includes a gate, a fall prevention unit, a support release unit, a first float, a floating prevention unit, a second float,
(Continued)

and a floating prevention release unit. The gate receives a flow of fluid, and is able to fall down toward a downstream direction of the flow. The fall prevention unit supports the gate, thereby preventing the gate from falling down. The support release unit releases the support for the gate by the fall prevention unit. The first float is arranged on an upstream side of the gate, is arranged on one of the left side and the right side of the gate viewed from upstream, and is less in the specific gravity than the fluid. The floating prevention unit prevents the first float from floating.

9 Claims, 18 Drawing Sheets

(51) Int. Cl.

| | | |
|---|---|---|
| *F16K 31/28* | (2006.01) | |
| *E02B 7/20* | (2006.01) | |
| *E02B 7/40* | (2006.01) | |
| *E03F 7/02* | (2006.01) | |
| *E02B 7/44* | (2006.01) | |
| *E03F 7/04* | (2006.01) | |
| *E03F 9/00* | (2006.01) | |

(52) U.S. Cl.
CPC .................. *E03F 7/02* (2013.01); *E03F 7/04* (2013.01); *E03F 9/007* (2013.01); *F16K 31/28* (2013.01); *F16K 33/00* (2013.01); *Y10T 137/7404* (2015.04)

(58) Field of Classification Search
CPC ......... Y10T 137/7404; Y10T 137/7394; Y10T 137/7485; F16K 31/18; F16K 31/28; F16K 31/20; F16K 33/00
See application file for complete search history.

(56) References Cited

FOREIGN PATENT DOCUMENTS

| | | | |
|---|---|---|---|
| EP | 2395163 | 12/2011 | |
| FR | 2833978 A1 * | 6/2003 | ............ E02B 13/02 |
| JP | 2004-360280 | 12/2004 | |
| JP | 2008-106461 | 5/2008 | |
| JP | 2010-180566 | 8/2010 | |
| JP | 2010-180567 | 8/2010 | |
| JP | 2010-180568 | 8/2010 | |
| JP | 5166309 | 3/2013 | |
| WO | 2010/090297 | 12/2010 | |

OTHER PUBLICATIONS

Hideki Koreyasu et al., "Gesuido Kanro no Jido Senjo Sochi (Flash Gate) no Sadosei to Koka ni Kansuru Chukan Hokoku", Proceedings of Sewage Research Conference, Jul. 8, 2011, pp. 578-580, with partial English translation.

Official Communication issued in WIPO Patent Application No. PCT/JP2015/067647, dated Aug. 18, 2015.

Official Communication in JP Appl. No. 2015-114450, dated Nov. 7, 2017.

\* cited by examiner

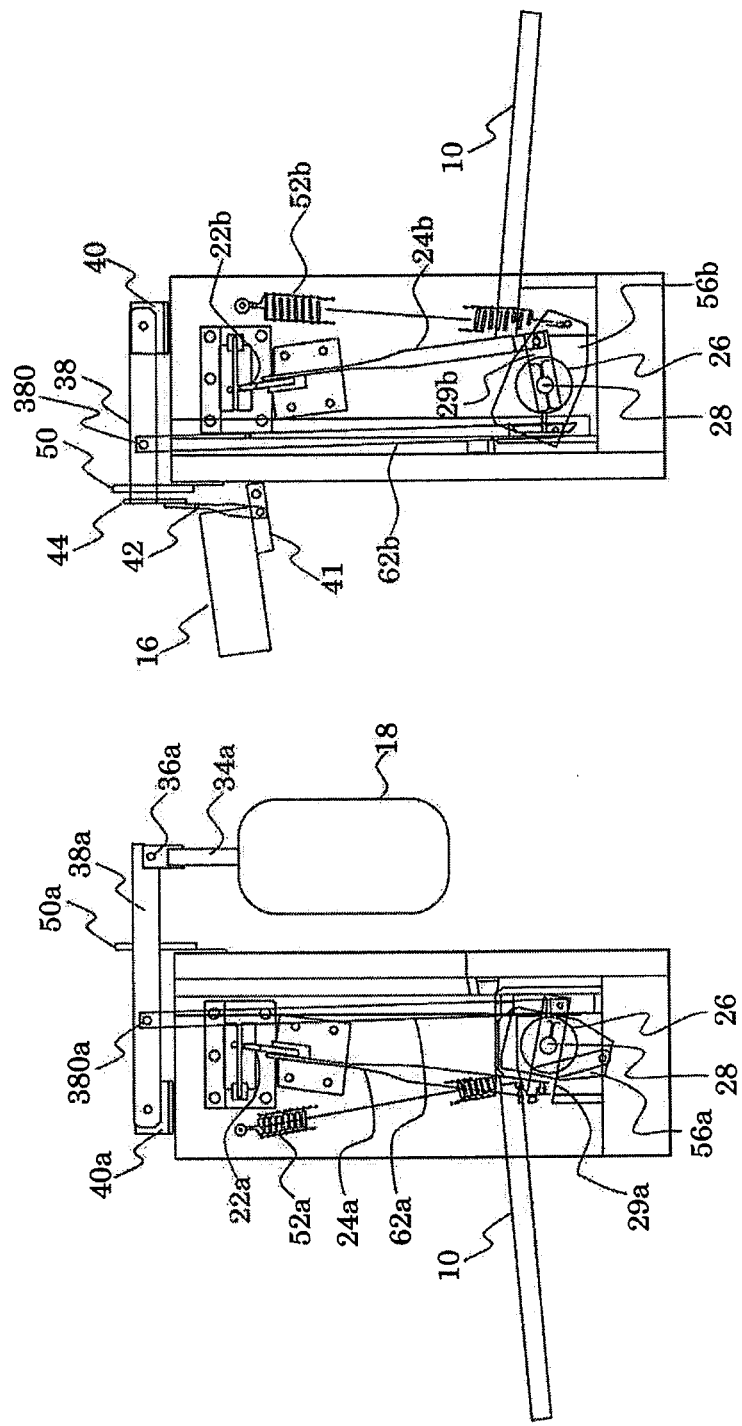

OPENING/CLOSING DEVICE

TECHNICAL FIELD

The present invention relates to an opening/closing device used in a flow passage such as a sewer.

BACKGROUND ART

Conventionally, there has been known an opening/closing device used in a flow passage such as a sewer (refer to Patent Document 1, for example). The opening/closing device is used to clean a section where garbage tends to be accumulated such as a slack portion or an inverted siphon structure of a flow passage. Such an opening/closing device usually dams the flow passage while a valve element (or a gate) is closed. Therefore, flowing sewage is gradually accumulated, and when a water level of the flow passage becomes equal to or more than a predetermined water level, the valve element falls down, and enters an open state, the water flows at once toward downstream of the flow passage, and the garbage can be flushed away even in the section that tends to accumulate the garbage. In other words, the flow passage can be cleaned.

It should be noted that in the opening/closing device described in PATENT DOCUMENT 1, two floats arranged in an up/down direction are used to open a valve element quickly. It should be noted that the lower float out of the two floats is thicker in the up/down direction than the upper float.

CITATION LIST

Patent Document

PATENT DOCUMENT 1: JP 5166309 B

SUMMARY OF INVENTION

However, when an operation such as maintenance management is carried out for the lower float out of the two floats arranged in the up/down direction, the upper float constitutes an obstacle. Therefore, when the maintenance management is carried out for the lower float, it may be even necessary to take out the opening/closing device itself from a manhole.

Therefore, it is an object of the present invention to provide an opening/closing device that allows an easy operation on the float thicker in the up/down direction out of the two floats.

According to the present invention, an opening/closing device includes: a gate that receives a flow of fluid, and is able to fall down toward a downstream direction of the flow; a fall prevention unit that supports the gate, thereby preventing the gate from falling down; a support release unit that releases the support for the gate by the fall prevention unit; a first float that is arranged on an upstream side of the gate, is arranged on one of the left side and the right side of the gate viewed from upstream, and is less in the specific gravity than the fluid; a floating prevention unit that prevents the first float from floating; a second float that is arranged on the upstream side of the gate, is arranged on the other one of the left side and the right side of the gate viewed from upstream, and is less in the specific gravity than the fluid; and a floating prevention release unit that releases the prevention of the first float from the floating by the floating prevention unit as the second float floats, wherein the support release unit is activated as the first float floats.

According to the thus constructed opening/closing device, a gate receives a flow of fluid, and is able to fall down toward a downstream direction of the flow. A fall prevention unit supports the gate, thereby preventing the gate from falling down. A support release unit releases the support for the gate by the fall prevention unit. A first float is arranged on an upstream side of the gate, is arranged on one of the left side and the right side of the gate viewed from upstream, and is less in the specific gravity than the fluid. A floating prevention unit prevents the first float from floating. A second float is arranged on the upstream side of the gate, is arranged on the other one of the left side and the right side of the gate viewed from upstream, and is less in the specific gravity than the fluid. A floating prevention release unit releases the prevention of the first float from the floating by the floating prevention unit as the second float floats. The support release unit is activated as the first float floats.

According to the opening/closing device of the present invention, the fall prevention unit may support a surface on a downstream side of the gate.

According to the opening/closing device of the present invention, the support release unit may pull the fall prevention unit toward an outside of the flow, thereby releasing the support for the gate.

According to the present invention, the opening/closing device may include: a suspension member that suspends the first float, and includes a portion that ascends as the first float floats; and an ascending member that is positioned above the second float, and has a portion that ascends as the ascending portion of the suspension member ascends, wherein the floating prevention unit may include: an abutting portion that is positioned above the ascending member, and abuts against the ascending member when the ascending portion of the ascending member ascends; and a fixing portion that rotatably fixes the abutting portion to a portion that is stationary with respect to the flow.

According to the opening/closing device of the present invention, the ascending member and the suspension member may be coupled to each other via a rotation shaft extending in the same direction as a rotation center of the gate.

According to the opening/closing device of the present invention, the floating prevention unit may include a rotatable portion that is able to rotate about the fixing portion; moreover, the abutting portion may rotate by an angle by which the rotatable portion rotates; and the floating prevention release unit may include a drive unit that moves the rotatable portion as the second float floats.

According to the present invention, the opening/closing device may include a descending portion that is coupled to the suspension member, and descends as the ascending portion of the suspension member ascends, wherein: the support release unit pulls the fall prevention unit toward an outside of the flow, thereby releasing the support for the gate; and further, the support release unit is coupled to the descending portion, and pulls the fall prevention unit toward the outside of the flow in response to a descent of the descending portion.

BRIEF DESCRIPTION OF DRAWINGS

FIGS. 5 (a) and 5 (b) show side views of the opening/closing device 1, and shows a left side view (FIG. 5(a)) and a right side view (FIG. 5(b)) viewed from the upstream side;

MODES FOR CARRYING OUT THE INVENTION

A description will now be given of embodiments of the present invention referring to drawings.

Figure 1A:
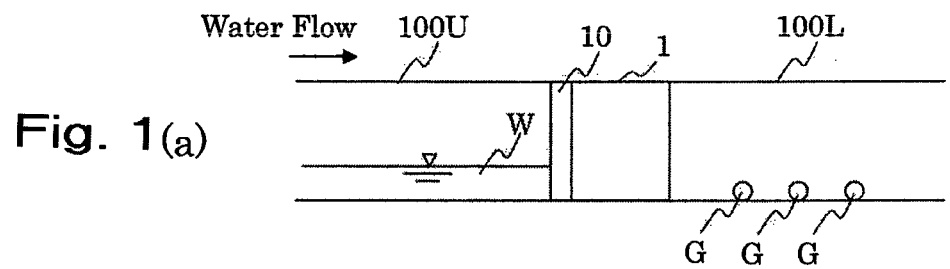
FIGS. 1 (a)-1(c) show an overview of an operation if an opening/closing device 1 according to the embodiment of the present invention is provided in sewers 100U and 100L, and shows a view when a water level of the sewer 100U is low (FIG. 1(a)), a view when the water level of the sewer 100U is increasing (FIG. 1(b)), and a view after the water level of the sewer 100U becomes equal to or more than a predetermined level (FIG. 1(c))
Figure 1B:
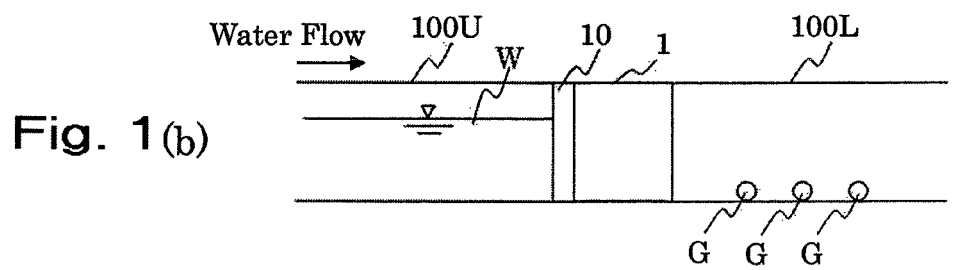
Figure 1C:
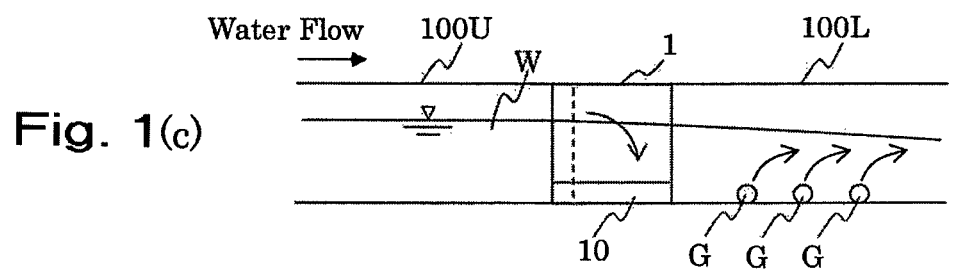

FIG. 1 shows an overview of an operation if an opening/closing device 1 according to the embodiment of the present invention is provided in sewers 100U and 100L, and shows a view when a water level of the sewer 100U is low (FIG. 1(a)), a view when the water level of the sewer 100U is increasing (FIG. 1(b)), and a view after the water level of the sewer 100U becomes equal to or more than a predetermined level (FIG. 1(c)). It should be noted that though a gate 10 of the opening/closing device 1 is shown, other components of the opening/closing device 1 are not shown in FIG. 1.

First, the sewer 100U is located on an upstream side, and the sewer 100L is located on a downstream side. It is herein assumed that a flow passage where garbage G tends to be accumulated in the sewer 100L if an opening/closing device is absent. The opening/closing device 1 is arranged between the sewer 100U and the sewer 100L through a manhole, which is not shown. The water level of a sewage W flowing in the sewer 100U is usually low (refer to FIG. 1(a)). On this occasion, the gate 10 is in an upright state, and receives the sewage W (a type of fluid) flowing through the sewer 100U. The sewage W is then dammed by the gate 10, and the sewage W does not flow to the sewer 100L on the downstream side. However, the garbage G is accumulated by sewage flowing into the sewer 100L.

On this occasion, the water level of the sewage W flowing in the sewer 100U increases due to the damming of the sewage W by the gate 10 (refer to FIG. 1(b)). Then, when the water level of the sewer 100U becomes equal to or more than the predetermined level (refer to FIG. 1(b)), the gate 10 falls down, and the sewage W flows from the sewer 100U to the sewer 100L (refer to FIG. 1(c). As a result, the garbage G accumulated in the sewer 100L flows away, and the sewer 100L can be cleaned.

Figure 2:
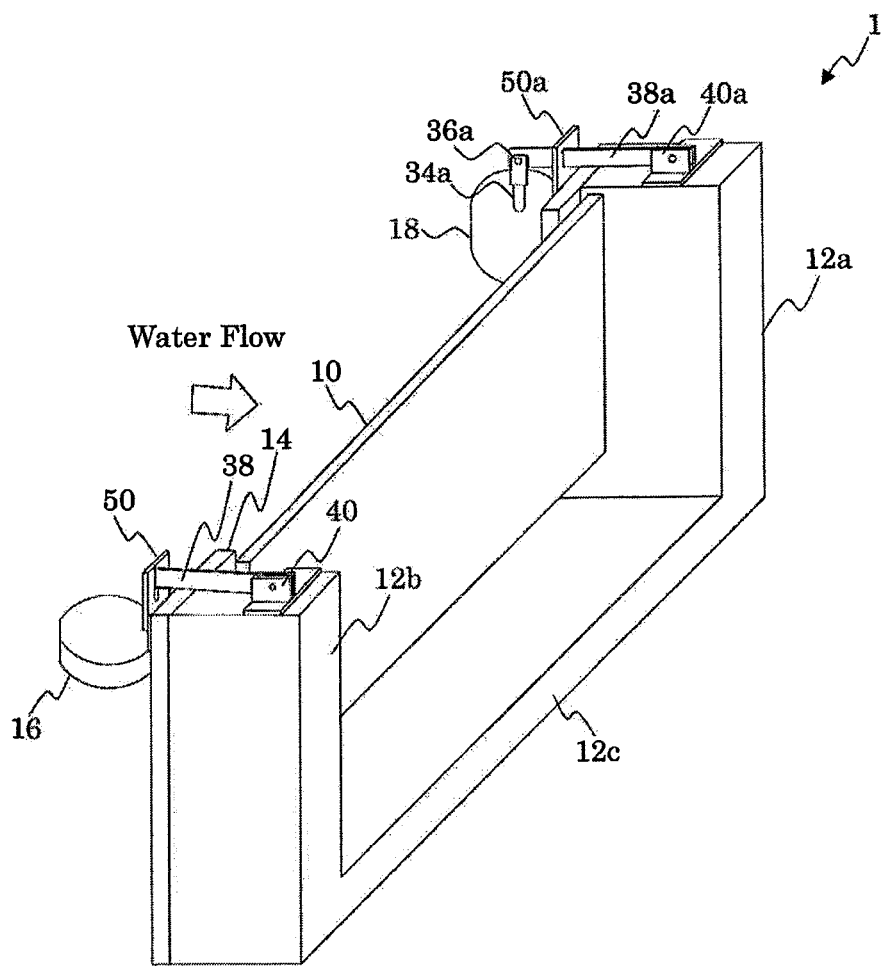
FIG. 2 is a perspective view of the opening/closing device 1 (in the upright state of the gate 10)
Figure 3:
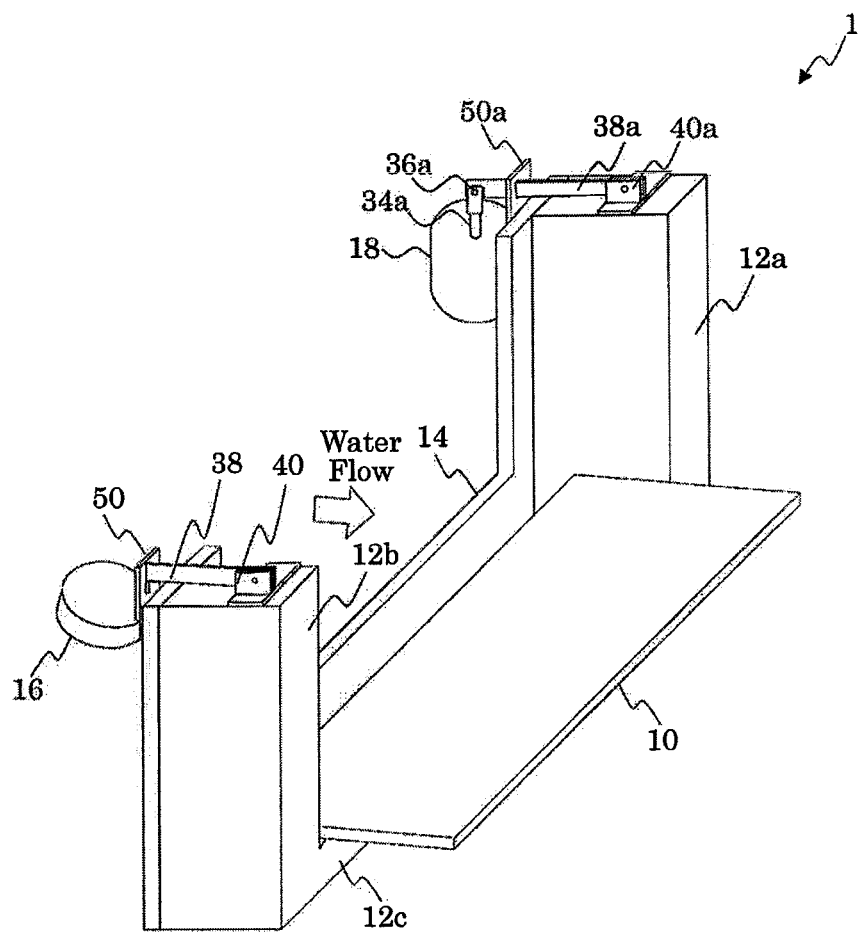
FIG. 3 is a perspective view of the opening/closing device 1 (in a fallen state of the gate 10)
Figure 4A:
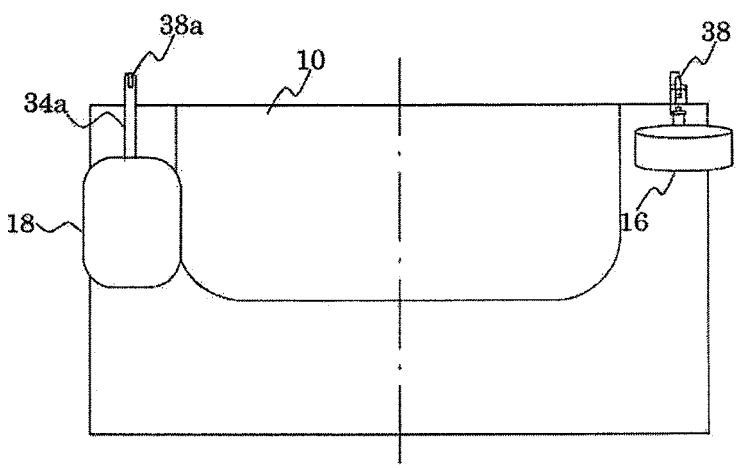
FIGS. 4 (a) and 4 (b) show a view of the opening/closing device 1 viewed from the upstream side (FIG. 4(a)) and a view viewed from the downstream side (FIG. 4(b))
Figure 4B:
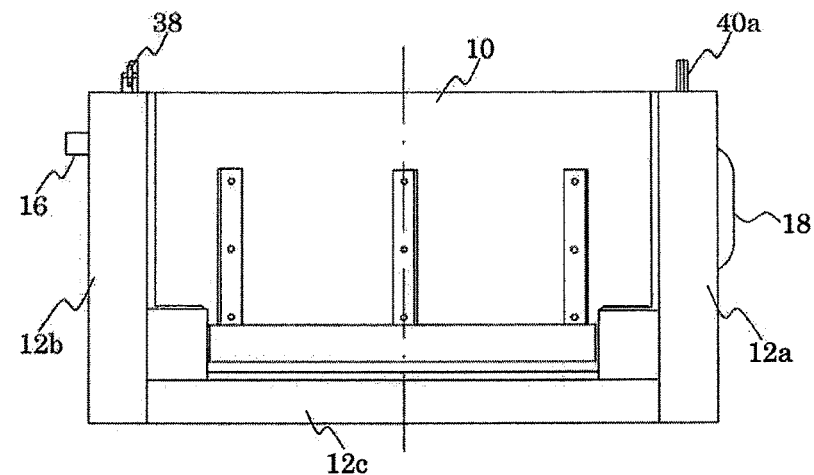

FIG. 2 is a perspective view of the opening/closing device 1 (in the upright state of the gate 10). FIG. 3 is a perspective view of the opening/closing device 1 (in a fallen state of the gate 10). FIG. 4 shows a view of the opening/closing device 1 viewed from the upstream side (FIG. 4(a)) and a view viewed from the downstream side (FIG. 4(b)).

The opening/closing device 1 includes the gate 10, frame columns 12a and 12b, a bottom portion 12c, a plate 14, a first float 18, a second float 16, a pendulous member 34a, a top fulcrum 36a, an ascending member 38, a suspension member 38a, suspension fulcrums 40 and 40a, and plates 50 and 50a.

The gate 10 is surrounded by the frame columns 12a and 12b standing by the gate 10 and the bottom portion 12c arranged at a bottom of the gate 10, and is further partially covered by the plate 14. The gate 10 receives and dams the water flow in the upright state (refer to FIG. 2). However, when the water level of the water flow increases, and the first float 18 and the second float 16 float, the gate 10 falls down toward the downstream side, and the fluid such as the sewage W flows downstream (refer to FIG. 3).

It should be noted that the left side is the upstream side, and the right side is the downstream side in FIG. 2 and FIG. 3. Moreover, it is assumed that the specific gravities of the first float 18 and the second float 16 are less than the specific gravity of the fluid that the gate 10 is receiving in the upright state. Moreover, the first float 18 and the second float 16 are arranged on the upstream side of the gate 10. Further, the second float 16 is arranged on the right side viewed from upstream, and the first float 18 is arranged on the left side viewed from upstream (also refer to FIG. 7). It should be noted that the second float 16 may be arranged on the left side viewed from upstream, and the first float 18 may be arranged on the right side viewed from upstream.

The first float 18 is fixed to a bottom end of the pendulous member 34a. The suspension member 38a is a member for suspending the first float 18 where the pendulous member 34a is fixed to the top fulcrum 36a thereof (also refer to FIG. 6(b)). The suspension member 38a is fixed to the frame column 12a by the suspension fulcrum 40a. The ascending member 38 is positioned above the second float 16. The ascending member 38 is fixed to the frame column 12b by the suspension fulcrum 40. When the first float 18 does not float, the pendulous member 34a does not ascend either, and the suspension member 38a remains horizontal (refer to FIG. 8). When the first float 18 floats, the pendulous member 34a also ascends, and the suspension member 38a rotates about the suspension fulcrum 40a so that the top fulcrum 36a ascends. It should be noted that an ascending portion 380a, which is a part of the suspension member 38a, also ascends as the first float 18 floats.

The plate 50 is fixed to a top portion of the frame column 12b. The plate 50a is fixed to a top portion of the frame column 12a.

Figure 6:
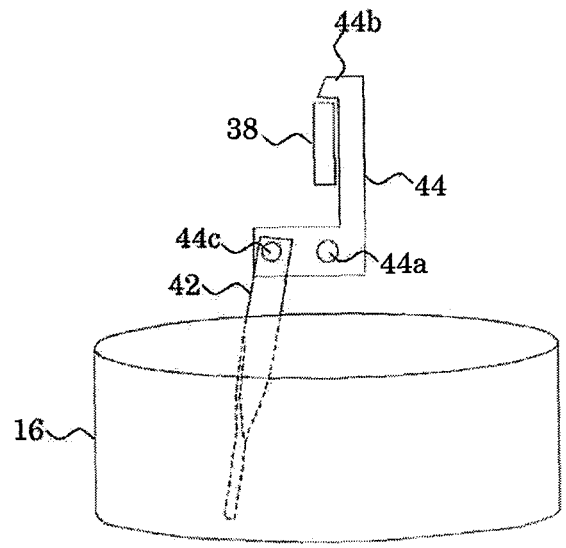
FIGS. 6 (a) and 6 (b) show an enlarged front view (FIG. 6(a)) (viewed from the upstream side) of a neighborhood of a floating prevention unit 44 of the opening/closing device 1 and an enlarged front view of a neighborhood of the first float 18 (FIG. 6(b))
Figure 6:
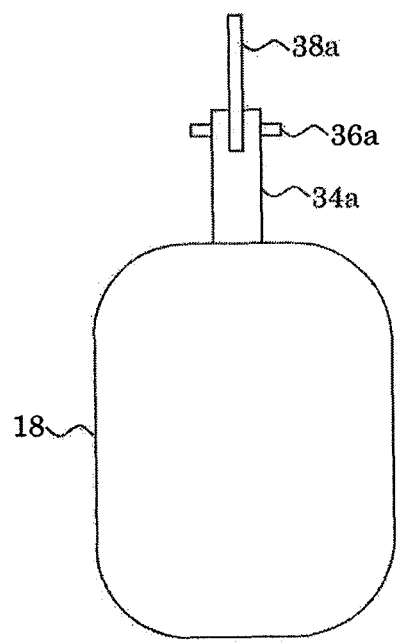
Figure 7:
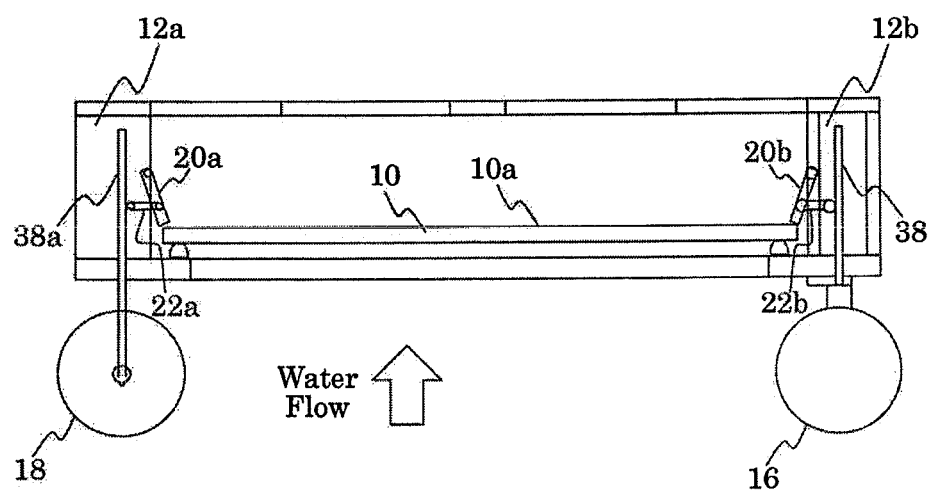
FIG. 7 is a plan view transparently showing neighborhoods of fall prevention units 20a and 20b while the gate 10 is in the upright state.

FIG. 5 shows side views of the opening/closing device 1, and shows a left side view (FIG. 5(a)) and a right side view (FIG. 5(b)) viewed from the upstream side. FIG. 6 shows an enlarged front view (FIG. 6(a)) (viewed from the upstream side) of a neighborhood of a floating prevention unit 44 of the opening/closing device 1 and an enlarged front view of a neighborhood of the first float 18 (FIG. 6(b)). FIG. 7 is a plan view transparently showing neighborhoods of fall prevention units 20a and 20b while the gate 10 is in the upright state.

The opening/closing device 1 includes, in addition to the components described above, the fall prevention units 20b and 20a, a first support release unit 22a, a second support release unit 22b, the floating prevention unit 44, a second float support beam 41, a floating prevention release unit 42, a gate rotation shaft 26, a common rotation shaft 28, rotation units 29b and 29a, descending portions 24b and 24a, a first spring 52a, a second spring (second force generation unit) 52b, and rotation bodies 56a and 56b.

The gate 10 can fall down about the hollow gate rotation shaft 26 (refer to FIG. 13) as a center of rotation (rotational axis).

Referring to FIG. 7, the fall prevention units 20b and 20a are in contact with a surface 10a on the downstream side, thereby exerting forces against the water flow on the gate 10. In other words, the fall prevention units 20b and 20a support the surface 10a on the downstream side of the gate 10. It should be noted that the fall prevention units 20b and 20a support the gate 10, thereby preventing the gate 10 from falling down toward the downstream side. The fall prevention unit 20b is arranged on the right side, and the fall prevention unit 20a is arranged on the left side viewed from the upstream side.

Referring to FIG. 7, the first support release unit 22a and the second support release unit 22b are symmetrical in a left/right direction viewed from the upstream side (and also viewed from the downstream side).

Figure 12:
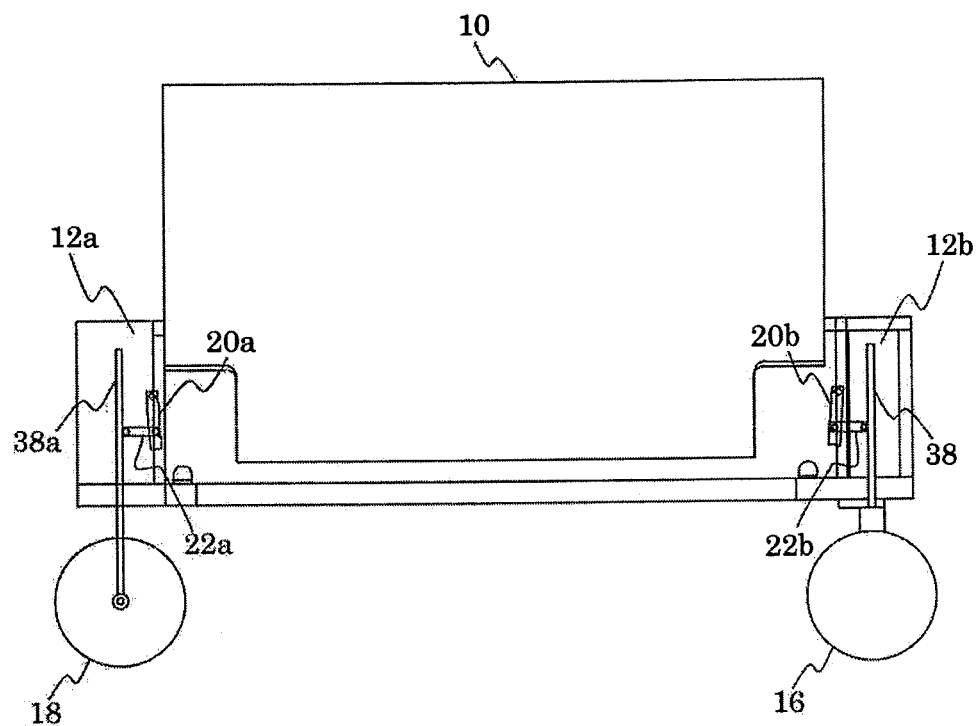
FIG. 12 is a plan view transparently showing neighborhoods of the fall prevention units 20a and 20b while the gate 10 is in the fallen state.

The first support release unit 22a pulls the fall prevention unit 20a toward an outside of the water flow (flow) (left side in FIG. 7) so as to displace a point at which the fall prevention unit 20a is in contact with the gate 10 from the gate 10, thereby releasing the support for the gate 10 by the fall prevention unit 20a (refer to FIG. 12).

The second support release unit 22b pulls the fall prevention unit 20b toward the outside of the water flow (flow) (right side in FIG. 7) so as to displace a point at which the fall prevention unit 20b is in contact with the gate 10 from the gate 10, thereby releasing the support for the gate 10 by the fall prevention unit 20b (refer to FIG. 12).

It should be noted that the second float 16, the floating prevention release unit 42, and the floating prevention unit 44 that would appear behind of the first float 18 are not shown in FIG. 5(a). The first float 18 that would appear behind the second float 16 is not shown in FIG. 5(b). The same holds true for other side views (except for FIG. 14).

The floating prevention unit 44 prevents the first float 18 from floating.

Referring to FIG. 6(a), the floating prevention unit 44 includes an abutting portion 44b, a fixing portion 44a, and a rotatable portion 44c. It should be noted that the floating prevention unit 44 may be accommodated in the flame column 12b.

Figures 13A, 13B, 13C:
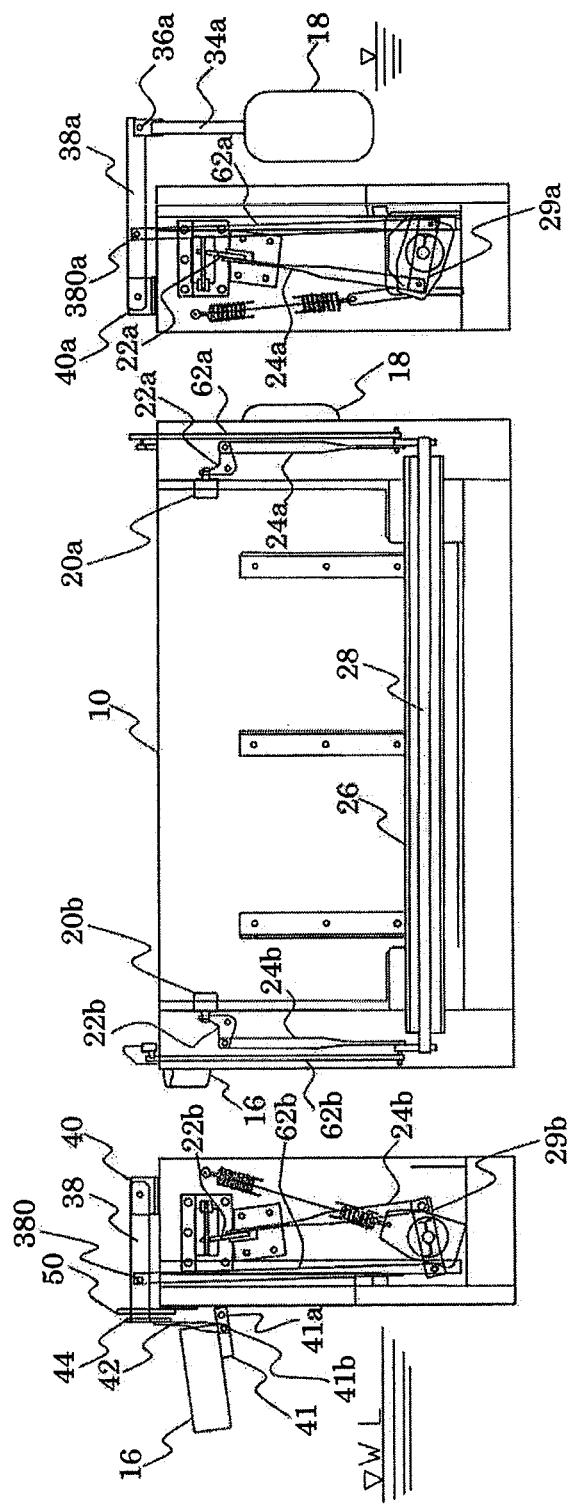
FIGS. 13 (a)-13 (c) show a right side view (FIG. 13(a)) and a left side view (FIG. 13(b)) of the opening/closing device 1 viewed from the downstream side, and a view of the opening/closing device 1 viewed from the downstream side (FIG. 13(c))

The abutting portion 44b is positioned above the ascending member 38, and abuts against the ascending member 38 when an ascending portion (a portion of the ascending member 38 directly below the abutting portion 44b) of the ascending member 38 ascends. The ascending member 38 includes an ascending portion 380 that ascends as the ascending portion 380a of the suspension member 38a ascends. Referring to FIG. 13, this is because that the ascending member 38 and the suspension member 38a are coupled to each other via the common rotation shaft 28 (extending in the same direction as that of the rotation center (gate rotation shaft 26) of the gate 10), a first coupling member 62a, and a second coupling member 62b. When the first float 18 floats, the ascending portion 380a ascends, and the ascending portion 380 also accordingly ascends. However, the ascending member 38 abuts against the abutting portion 44b, the ascending portion 380 cannot thus ascend either, and the first float 18 cannot float.

The fixing portion 44a fixes the abutting portion 44b to a portion (such as the plate 50) that is stationary with respect to the flow. It should be noted that the abutting portion 44b can rotate about the fixing portion 44a. It should be noted that the state where the fixing portion 44a is fixed to the plate 50 is not shown in other drawings.

The rotatable portion 44c is positioned approximately as high as the fixing portion 44a, and can rotate about the fixing portion 44a.

It should be noted that the abutting portion 44b and the rotatable portion 44c are integrated with each other, and the abutting portion 44b rotates about the fixing portion 44a by an angle by which the rotatable portion 44c rotates about the fixing portion 44a.

The second float support beam 41 is fixed to the frame column 12b at a fulcrum 41a (refer to FIG. 8), and supports the second float 16. The second float support beam 41 can rotate about the fulcrum 41a.

The floating prevention release unit (drive unit) 42 is rotatably connected to a connection point 41b (arranged on the upstream side with respect to the fulcrum 41a) (refer to FIG. 8) of the second float support beam 41. When the second float 16 floats, the second float support beam 41 rotates about the fulcrum 41a, and the connection point 41b ascends. Then, the floating prevention release unit (drive unit) 42 ascends, and pushes and moves the rotatable portion 44c upward, and the rotatable portion 44c rotates about the fixing portion 44a. Consequently, the abutting portion 44b moves from above the ascending member 38 (refer to FIG. 11), and there exists nothing that prevents the portion of the ascending member 38 immediately below the abutting portion 44b from ascending. The floating prevention release unit (drive unit) 42 releases the prevention of the floating of the first float 18 by the floating prevention unit 44 in this way as the second float 16 floats.

The common rotation shaft 28 is arranged inside the hollow gate rotation shaft 26, and extends in the same direction as the gate rotation shaft 26 referring to FIG. 13(*c*).

Rotation units 29*b* and 29*a* are fixed to the common rotation shaft 28, and rotate together with the common rotation shaft 28. For example, when the rotation unit 29*b* rotates, the common rotation shaft 28 rotates together with the rotation. As the common rotation shaft 28 rotates, the rotation unit 29*a* rotates.

The first coupling member 62*a* is connected at one end to the ascending portion 380*a* of the suspension member 38*a*, and is connected at the other end to the rotation unit 29*a*. The second coupling member 62*b* is connected at one end to the ascending portion 380 of the ascending member 38, and is connected at the other end to the rotation unit 29*b*.

The descending portion 24*b* is rotatably fixed to an end (on the opposite side of the end to which the second coupling member 62*b* is connected) of the rotation unit 29*b*. When the rotation unit 29*b* clockwise rotates in FIG. 5(*b*), the descending portion 24*b* accordingly descends.

It should be noted that the descending portion 24*b* is coupled to the ascending member 38 via the second coupling member 62*b* and the rotation unit 29*b*. As the ascending portion 380 of the ascending member 38 ascends, the rotation unit 29*b* clockwise rotates in FIG. 5(*b*), and the descending portion 24*b* descends.

The descending portion 24*a* is rotatably fixed to an end of the rotation unit 29*a*. When the rotation unit 29*a* counterclockwise rotates in FIG. 5(*a*) (which corresponds to a clockwise rotation in FIG. 5(*b*)), the descending portion 24*a* accordingly descends.

It should be noted that the descending portion 24*a* is coupled to the suspension member 38*a* via the first coupling member 62*a* and the rotation unit 29*a*. As the ascending portion 380*a* of the suspension member 38*a* ascends, the rotation unit 29*a* counterclockwise rotates in FIG. 5(*a*), and the descending portion 24*a* descends.

The rotation unit 29*a* and the descending portion 24*a* constitute a first release action unit. The first release action unit causes the descending portion 24*a* to descend while rotating (counterclockwise rotation in FIG. 5(*a*)) the common rotation shaft 28 through the rotation unit 29*a*, thereby pulling the first support release unit 22*a* to activate the first support release unit 22*a*.

Referring to FIG. 13(*c*), the first support release unit 22*a* is in a shape bent approximately by the right angle, is coupled to the descending portion 24*a* at a horizontal portion thereof, is coupled to the fall prevention unit 20*a* at a portion extending in the up/down direction, and can rotate about the portion bent by the right angle.

Thus, when the descending portion 24*a* is caused to descend, thereby pulling the first support release unit 22*a*, the first support release unit 22*a* clockwise rotates in FIG. 13(*c*), thereby pulling the fall prevention unit 20*a*, resulting in the activation of the first support release unit 22*a*.

The rotation unit 29*b* and the descending portion 24*b* constitute a second release action unit. In the second release action unit, as the common rotation shaft 28 rotates (clockwise rotation in FIG. 5(*b*)), the rotation unit 29*b* rotates to cause the descending portion 24*b* to descend, thereby pulling the second support release unit 22*b*, resulting in the activation of the second support release unit 22*b*.

Referring to FIG. 13(*c*), the second support release unit 22*b* is in a shape bent approximately by the right angle, is coupled to the descending portion 24*b* at a horizontal portion thereof, is coupled to the fall prevention unit 20*b* at a portion extending in the up/down direction, and can rotate about the portion bent by the right angle.

Thus, when the descending portion 24*b* is caused to descend, thereby pulling the second support release unit 22*b*, the second support release unit 22*b* counterclockwise rotates in FIG. 13(*c*), thereby pulling the fall prevention unit 20*b*, resulting in the activation of the second support release unit 22*b*.

It should be noted that the second release action unit (rotation unit 29*b* and descending portion 24*b*) and the first release action unit (rotation unit 29*a* and descending portion 24*a*) are symmetrical in the left/right direction viewed from the upstream side (and also viewed from the downstream side).

It should be noted that a description will later be given of the first spring 52*a*, the second spring (second force generation unit) 52*b*, and the rotation bodies 56*a* and 56*b* referring to FIG. 15 and the like.

A description will now be given of an operation (until the gate 10 has fallen down after the water increases from a low level to a high level) of the embodiment of the present invention.

The water level of the sewage W is usually low.

Figure 8:
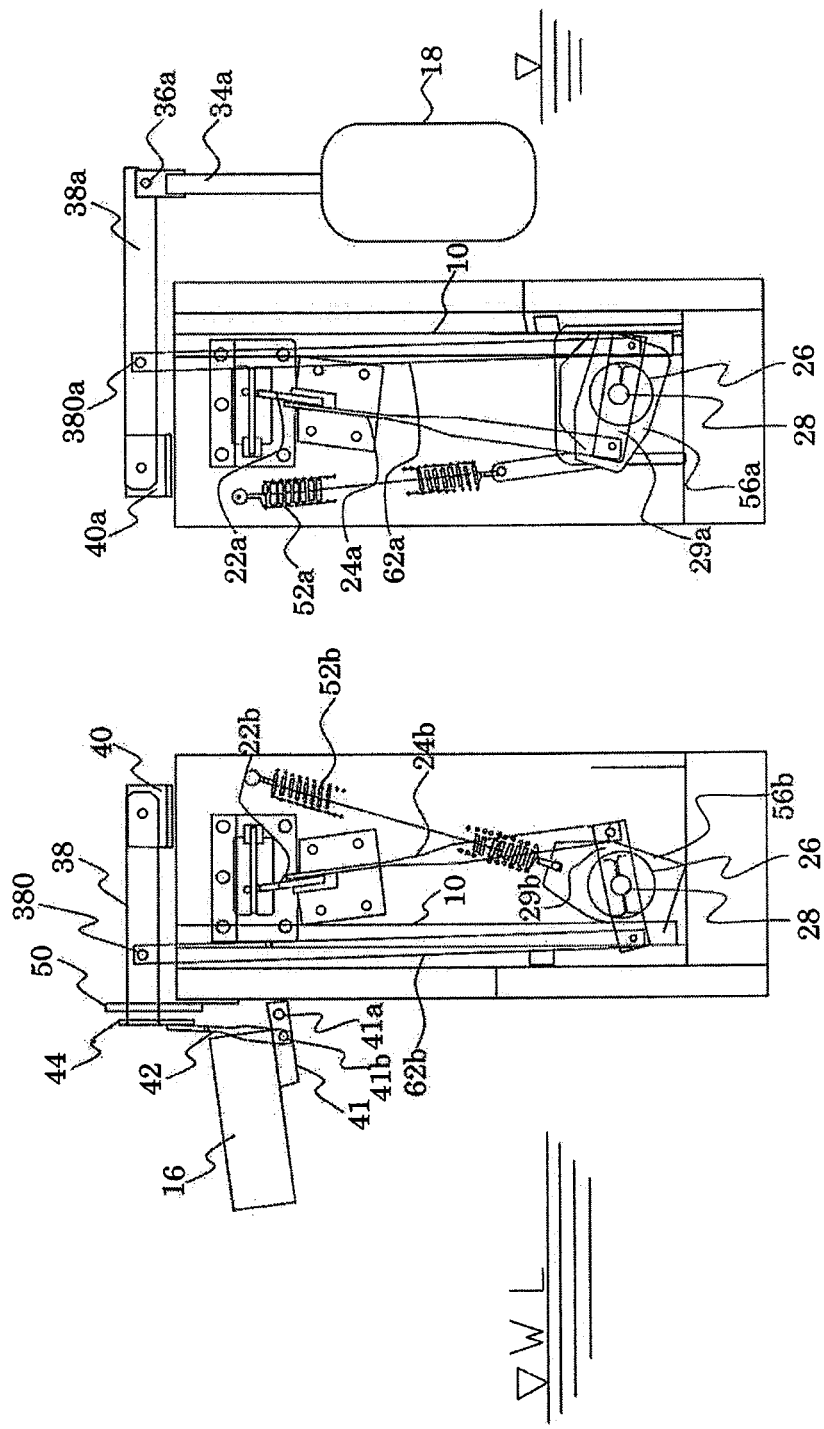
FIGS. 8 (a) and 8 (b) show a left side view (FIG. 8(a)) and a right side view (FIG. 8(b)) of the opening/closing device 1 viewed from the upstream side when the water level (denoted by W.L.) of the sewage W is low.

FIG. 8 shows a left side view (FIG. 8(*a*)) and a right side view (FIG. 8(*b*)) of the opening/closing device 1 viewed from the upstream side when the water level (denoted by W.L.) of the sewage W is low. Referring to FIG. 8, when the water level (denoted by W.L.) of the sewage W is low, a state on this occasion is just as described referring to FIGS. 5 (*a*) and (*b*), and the gate 10 is supported by the fall prevention units 20*b* and 20*a*, and thus remains upright.

Then, the water level of the sewage W increases due to a rainfall or the like.

Figure 9:
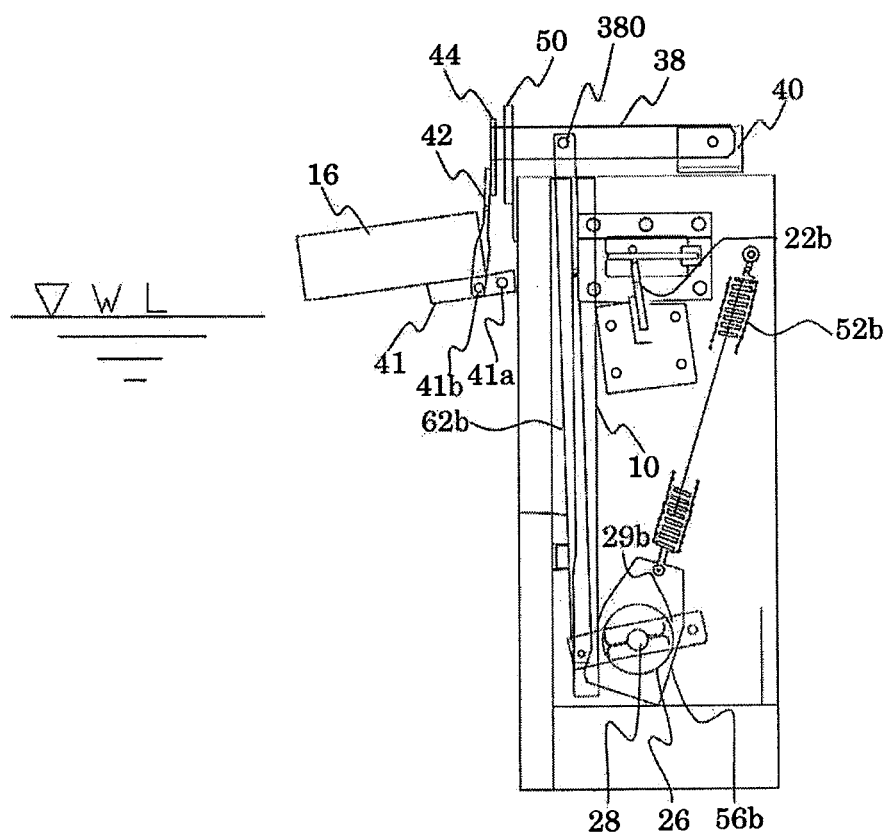
FIG. 9 is a right side view of the opening/closing device 1 when the water level (denoted by W.L.) of the sewage W increases, and becomes more than a top end of the first float 18, but the second float 16 is approximately above the water level of the sewage W.

FIG. 9 is a right side view of the opening/closing device 1 when the water level (denoted by W.L.) of the sewage W increases, and becomes more than a top end of the first float 18 (not shown in FIG. 9), but the second float 16 is approximately above the water level of the sewage W. It should be noted that the descending portion 24*b* is not shown in FIG. 9.

The first float 18 is submerged in the sewage W, the specific gravity of the first float 18 is less than the specific gravity of the sewage W, the first float 18 would thus float, and the top end of the first float 18 would exceed the water level of the sewage W. However, the first float 18 does not float.

When the first float 18 floated, the suspension member 38*a* would rotate about the suspension fulcrum 40*a* (counterclockwise in FIG. 13(*a*)), and the ascending portion 380*a* would also accordingly ascend. The ascent of the ascending portion 380*a* would also cause the ascent of the first coupling member 62*a*, and the rotation unit 29*a* would consequently rotate (counterclockwise in FIG. 13(*a*)). The rotation of the rotation unit 29*a* would be transmitted to the rotation unit 29*b* via the common rotation shaft 28, and the rotation unit 29*b* would also rotate (clockwise in FIG. 13(*b*)). When the rotation unit 29*b* rotated, the ascending portion 380 would also accordingly ascend. However, the ascending member 38 abuts against the abutting portion 44*b* (refer to FIG. 6(*a*)), the ascending portion 380 cannot ascend either, and the first float 18 cannot thus float.

The water level of the sewage W increases further.

Figure 10:
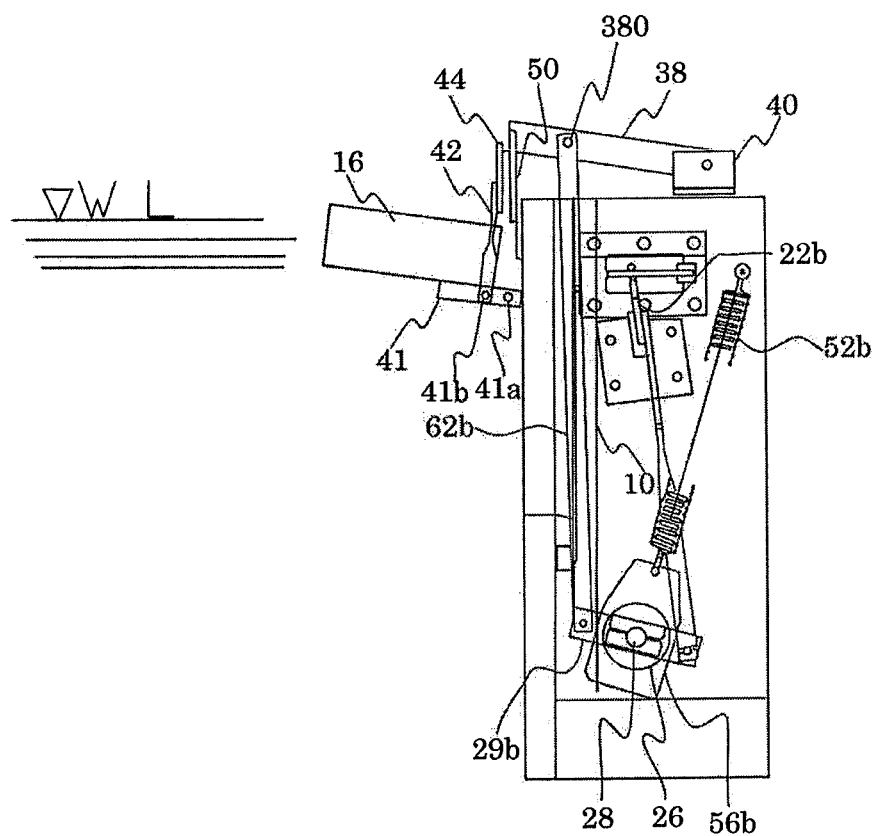
FIG. 10 is a right side view of the opening/closing device 1 when the water level (denoted by W.L.) of the sewage W further increases, and the second float 16 floats.

FIG. 10 is a right side view of the opening/closing device 1 when the water level (denoted by W.L.) of the sewage W further increases, and the second float 16 floats.

Both the second float 16 and the first float 18 are in shapes providing a buoyant force sufficient for the operation. For example, it is conceivable that the first float 18 may be made of a foam material. For example, it is conceivable to use an object fabricated from a ball tap (object in a ball shape made of polyethylene) as the second float 16. The second float 16 and the first float 18 are equal to each other in an outer diameter of a bottom surface. However, the second float 16 is thinner in the up/down direction than the first float 18. Thus, the second float 16 is lighter than the first float 18. This means that when the second float 16 is partially submerged in the sewage W, it tends to float quickly. Moreover, a height at which the second float 16 is arranged is approximately equal to a height at which the top end of the first float 18 is positioned (refer to FIG. 14, for example), and the second float 16 thus tends to float quickly when the water level of the sewage W reaches a neighborhood of a top end of the gate 10. It should be noted that the height at which the top end of the first float 18 is positioned is lower than the top end of the gate 10, but is approximately equal to the height at which the top end of the gate 10 is positioned.

Figure 11:
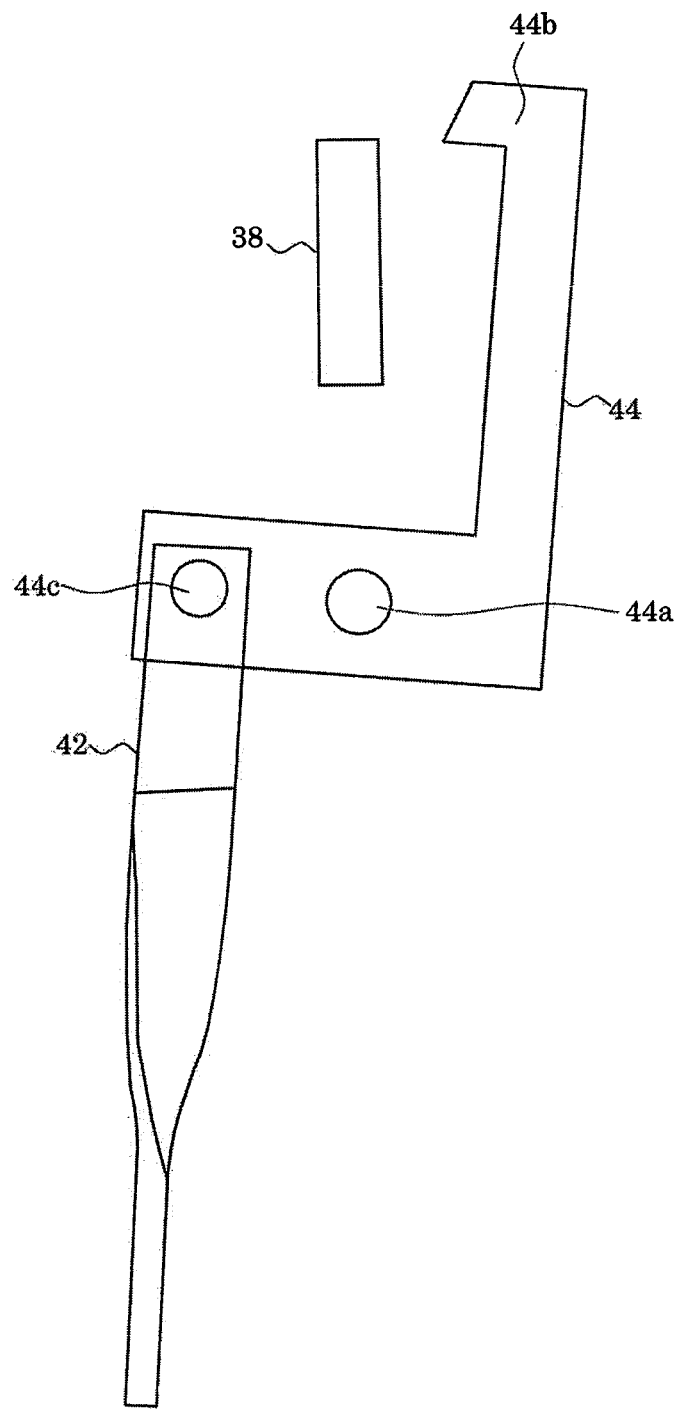
FIG. 11 is an enlarged front view of a neighborhood of the floating prevention unit 44 of the opening/closing device 1 when the floating prevention unit 44 rotates.

FIG. 11 is an enlarged front view of a neighborhood of the floating prevention unit 44 of the opening/closing device 1 when the floating prevention unit 44 rotates.

When the second float 16 is partially submerged in the sewage W, and floats quickly, the second float support beam 41 rotates about the fulcrum 41*a*, and the connection point 41*b* ascends. Then, the floating prevention release unit (drive unit) 42 ascends, and pushes and moves the rotatable portion 44*c* upward, and the rotatable portion 44*c* rotates about the fixing portion 44*a*. Then, the abutting portion 44*b* moves from above the ascending member 38 (refer to FIG. 11), and there exists nothing that prevents the portion of the ascending member 38 immediately below the abutting portion 44*b* from ascending. There thus exists nothing that prevents the ascending portion 380*a* of the suspension member 38*a* from ascending, and there also exists nothing that prevents the first float 18 from floating.

On this occasion, the first float 18 is totally submerged in the sewage W, and is receiving a large buoyant force, and the first float 18 thus floats quickly. As a result, the suspension member 38*a* rotates about the suspension fulcrum 40*a* (counterclockwise in FIG. 5(*a*)).

Then, the first coupling member 62*a* ascends, thereby causing the descending portion 24*a* to descend while the rotation unit 29*a* is rotating the common rotation shaft 28 (counterclockwise in FIG. 5(*a*)). When the descending portion 24*a* is caused to descend, thereby pulling the first support release unit 22*a*, the first support release unit 22*a* clockwise rotates in FIG. 13(*c*), thereby pulling the fall prevention unit 20*a* toward the outside of the flow (left side in FIG. 7), resulting in the activation of the first support release unit 22*a*. The fan prevention unit 20*a* is thus displaced from the gate 10 (refer to FIG. 12).

FIG. 13 shows a right side view (FIG. 13(*a*)) and a left side view (FIG. 13(*b*)) of the opening/closing device 1 viewed from the downstream side, and a view of the opening/closing device 1 viewed from the downstream side (FIG. 13(*c*)). It should be noted that the common rotation shaft 28 is transparently shown, and the first release action unit (the rotation unit 29*a* and the descending portion 24*a*), the second release action unit (rotation unit 29*b* and the descending portion 24*b*), the fall prevention units 20*b* and 20*a*, the first support release unit 22*a*, and the second support release unit 22*b* are further shown in FIG. 13(*c*).

When the common rotation shaft 28 rotates (counterclockwise in. FIG. 5(*a*)), the common rotation shaft 28 clockwise rotates in FIG. 5(*b*), the descending portion 24*b* descends, thereby pulling the second support release unit 22*b*, and the second support release unit 22*b* counterclockwise rotates in FIG. 13(*c*), thereby pulling the fall prevention unit 20*b*, resulting in the activation of the second support release unit 22*b*. The fall prevention unit 20*b* is thus displaced from the gate 10 (refer to FIG. 12).

In this way, as the first float 18 floats (it should be noted that "float" does not necessarily requires the exposure of the top end from the water surface, and also includes a movement of the top end toward the water surface), the first support release unit 22*a* and the second support release unit 22*b* are activated.

It should be noted that FIG. 12 is a plan view transparently showing neighborhoods of the fall prevention units 20*a* and 20*b* while the gate 10 is in the fallen state. The fall prevention units 20*a* and 20*b* have been displaced from the gate 10, and the gate 10 thus falls down toward the downstream side by the water pressure of the sewage W.

Figure 14:
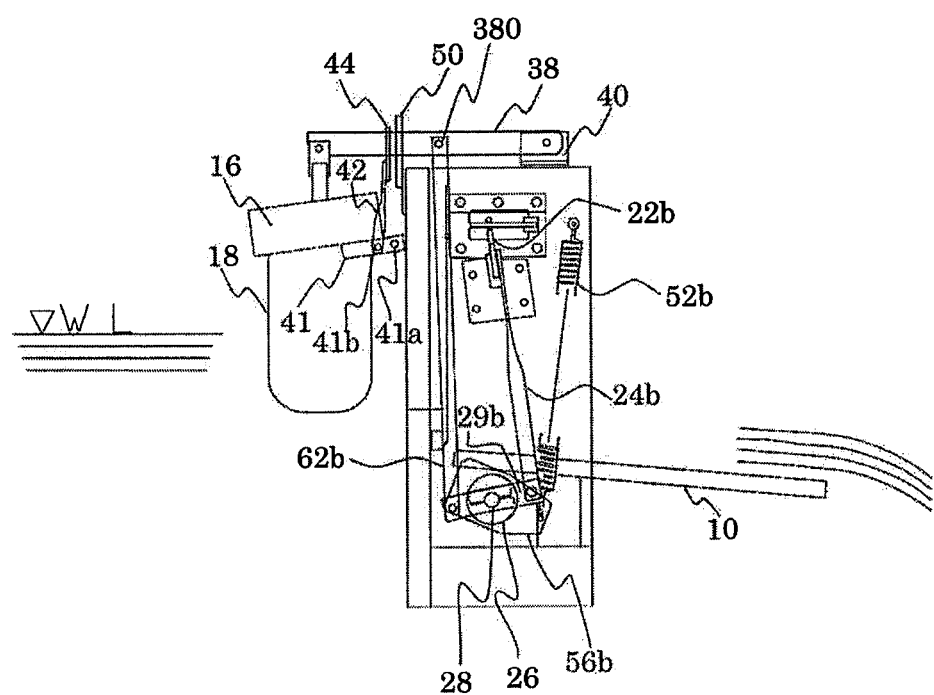
FIG. 14 is a right side view of the opening/closing device 1 after the sewage W has flown toward the downstream side.

FIG. 14 is a right side view of the opening/closing device 1 after the sewage W has flown toward the downstream side. When the water level is decreased below the bottom end of the second float 16 by the flow of the sewage W toward the downstream side and the like, the first float 18 descends while floating on the water surface of the sewage W. As a result, the ascending member 38 also returns to the horizontal position. Moreover, the second float 16 descends, the connection point 41*b* also descends, and the floating prevention unit 44 returns to the original position for pressing the ascending member 38 (refer to FIG. 6(*a*)).

According to the embodiment of the present invention, even when the first float 18 is submerged in the sewage W, the floating prevention unit 44 still presses the ascending member 38 until the second float 16 floats (refer to FIG. 6(*a*)), and the first float 18 thus cannot float.

On this occasion, when the second float 16 floats quickly, the floating prevention unit 44 accordingly rotates, and no longer presses the ascending member 38 (refer to FIG. 11), and the first float 18 starts floating quickly (the first float 18 has already been submerged, and a large buoyant force is acting on the first float 18). As a result, the suspension member 38*a* counterclockwise rotates about the fulcrum 40*a* in FIG. 5(*a*), the first coupling member 62*a* ascends, the rotation unit 29*a* consequently counterclockwise rotates, the descending portion 24*a* descends, thereby pulling the first support release unit 22*a* (refer to FIG. 13), the fall prevention unit 20*a* is pulled, and the support for the gate 10 is released.

Moreover, as the rotation unit 29*a* rotates, the common rotation shaft 28 rotates, the rotation unit 29*b* rotates (clockwise in FIG. 5(*b*)), the descending portion 24*b* descends, thereby pulling the second support release unit 22*b* (refer to FIG. 13), the fall prevention unit 20*b* is pulled, and the support for the gate 10 is released. It should be noted that the transmission of the action through the pulling is useful in principle for carrying out the release of the support at the same time for the gate 10 by the fall prevention units 20*a* and 20*b*.

On this occasion, the first float 18 floats quickly, the release of the support by the fall prevention units 20*a* and 20*b* is thus also carried out quickly, and the gate 10 can thus fall down to open quickly.

Moreover, though the fall prevention units 20*a* and 20*b* are coupled to each other by the common rotation shaft 28, the common rotation shaft 28 is arranged inside the hollow gate rotation shaft 26, the sewage W is prevented from entering into the inside of the gate rotation shaft 26, and the common rotation shaft 28 is not thus exposed to the sewage W.

Further, the first float 18 (left side, refer to FIG. 7) is on the opposite side of the second float 16 (right side, refer to FIG. 7) viewed from the upstream side, the second float 16 does not constitute an obstacle when an operation is carried out for the first float 18 compared with such a conventional technology that the second float 16 is located on the first float 18. Thus, it is possible to easily carry out an operation on the float thicker (first float 18) in the up/down direction out of the two floats (first float 18 and second float 16).

Moreover, a shape and a size of the first float 18 are heavily restricted so as not to obstruct the operation of the second float 16 according to such a conventional technology that the second float 16 is located on the first float 18. For example, an increase in the thickness in the up/down direction of the first float 18 is restricted. Therefore, the buoyant force of the first float 18 is limited by such a restriction, and the buoyant force required for the first float 18 may not be secured sufficiently.

However, the first float 18 (left side, FIG. 7) is on the opposite side of the second float 16 (right side, refer to FIG. 7) viewed from the upstream side, and the first float 18 thus hardly obstructs the operation of the second float 16 according to the embodiment of the present invention. As a result, the shape and the size of the first float 18 are hardly restricted by the second float 16. For example, the thickness in the up/down direction of the first float 18 can be increased so as to sufficiently secure the buoyant force required for the first float 18.

Moreover, a mechanism that holds a member for suspending and penetrating the first float 18 is provided at a bottom portion of the first float 18 so as to decrease a left/right displacement of the member for suspending and penetrating the first float 18 (so as to decrease a diameter of a through hole in the up/down direction of the first float 18) in such a conventional technology that the second float 16 is located on the first float 18.

However, the first float 18 is suspended, but is not penetrated in the up/down direction, and the hold mechanism does not thus need to be provided at the bottom portion of the first float 18 according to the embodiment of the present invention. Therefore, attachment of pollutant to the hold mechanism (which causes a defective operation) no longer occurs. Moreover, the number of components of the opening/closing device decreases, resulting in contribution to improvement in maintainability and manageability.

Moreover, the opening/closing device 1 according to the embodiment of the present invention is configured to return to the state where the gate 10 is upright after the gate 10 falls down, and the water level of the flow passage then decreases.

Figure 15:
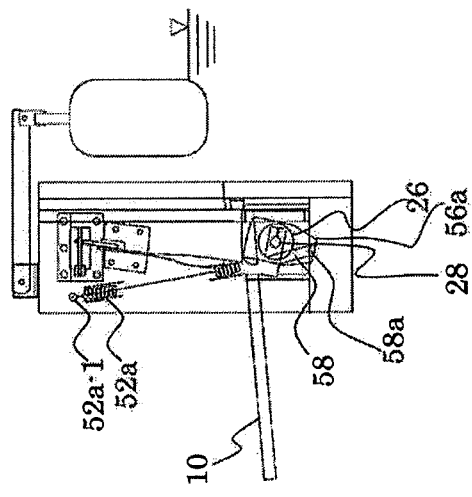
FIGS. 15 (a) and 15 (b) show side views of the opening/closing device 1 when the gate 10 falls down, and shows a left side view (FIG. 15(a)) and a right side view (FIG. 15(b)) viewed from the upstream side.
Figure 15:
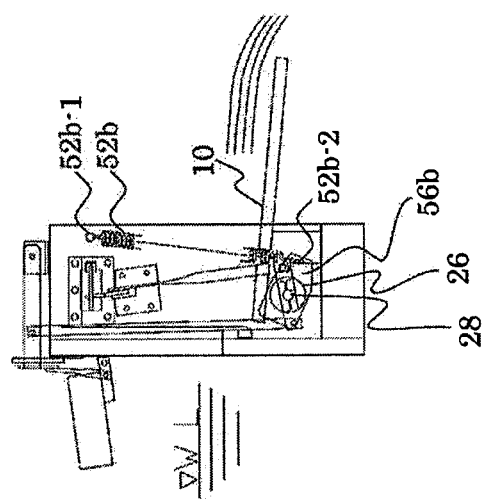

FIG. 15 shows side views of the opening/closing device 1 when the gate 10 falls down, and shows a left side view (FIG. 15(*a*)) and a right side view (FIG. 15(*b*)) viewed from the upstream side. The opening/closing device 1 includes the first spring 52*a*, the second spring (second force generation unit) 52*b*, and rotation bodies 56*a* and 56*b* as described before. Further, the opening/closing device 1 includes a link 58.

The rotation bodies 56*a* and 56*b* are fixed to the gate rotation shaft 26, and rotate together with the gate rotation shaft 26.

A first force generation unit is constituted by the first spring 52*a* and the link 58. The first spring 52*a* is fixed to one end 52*a*-1 of the first force generation unit. The link 58 is fixed to the other end 58*a* of the first force generation unit, and is coupled to the first spring 52*a*.

The one end 52*a*-1 of the first force generation unit is fixed above the gate rotation shaft 26. The other end 58*a* of the first force generation unit is fixed to the rotation body 56*a*, and is arranged at a position separated by a predetermined length from (the center of) the gate rotation shaft 26. In other words, even when the rotation body 56*a* rotates together with the gate rotation shaft 26, the distance (predetermined length) between the other end 58*a* of the first force generation unit and (the center of) the gate rotation shaft 26 does not change.

The first spring 52*a* generates a force required for the gate 10 to return to the upright state. It should be noted that the first spring 52*a* generates a force that is not sufficient for the gate 10 to return to the upright state when the gate 10 is in the fallen state. Referring to FIG. 15(*a*), a distance D1 (corresponding to the length of a perpendicular line from the center of the gate rotation shaft 26 to the straight line connecting between the one end 52*a*-1 and the other end 58*a*) between a straight line connecting between one end 52*a*-1 of the first force generation unit and the other end 58*a* of the first force generation unit and the center of the gate rotation shaft 26 is short when the gate 10 is in the fallen state. Thus, a torque for clockwise rotating the gate rotation shaft 26 in FIG. 15(*a*) is low, and the force required for bringing the gate 10 into the upright state is not sufficient.

The second force generation unit includes the second spring 52*b* fixed both to one end 52*b*-1 of the second force generation unit and the other end 52*b*-2 of the second force generation unit. It should be noted that it is conceivable that the second spring 52*b* is fixed to the one end 52*b*-1 (or the other end 52*b*-2), a link is connected to the other end 52*b*-2 (or the one end 52*b*-1), and the second spring 52*b* is connected to the link.

The one end 52*b*-1 of the second force generation unit is fixed above the gate rotation shaft 26. The other end 52*b*-2 of the second force generation unit is fixed to the rotation body 56*b*, and is arranged at a position separated by a predetermined length from (the center of) the gate rotation shaft 26. In other words, even when the rotation body 56*b* rotates together with the gate rotation shaft 26, the distance (predetermined length) between the other end 52*b*-2 of the second force generation unit and (the center of) the gate rotation shaft 26 does not change.

It should be noted that a distance D2 (corresponding to the length of a perpendicular line from the center of the gate rotation shaft 26 to the straight line connecting between the one end 52*b*-1 and the other end 52*b*-2) between a straight line connecting between the one end 52*b*-1 of the second force generation unit and the other end 52*b*-2 of the second force generation unit and the center of the rotation of the gate rotation shaft 26 is longer than the distance D1 when the gate 10 is in the fallen state. However the second spring 52*b* is longer than the first spring 52*a* (smaller in spring constant), and the torque for the counterclockwise rotation in FIG. 15(*b*) is low.

It should be noted that there is provided such a configuration as to generate a force sufficient for starting to bring the gate 10 into the upright state by adjusting the distance D2 and/or the length of contracting the second spring 52*b* when the water level of the flow passage in which the fluid (sewage W) flows is equal to or less than a predetermined water level. It should be noted that the configuration does not set the force of the second spring 52*b* to be too large, and thus does not generate a force sufficient for starting to bring the gate 10 into the upright state even when the water level of the flow passage is still high.

Then, when the water level becomes equal to or less than a predetermined water level, the gate rotation shaft 26 is rotated by a contraction force of the second spring 52b, thereby the gate 10 is slightly raised.

Figure 16B:
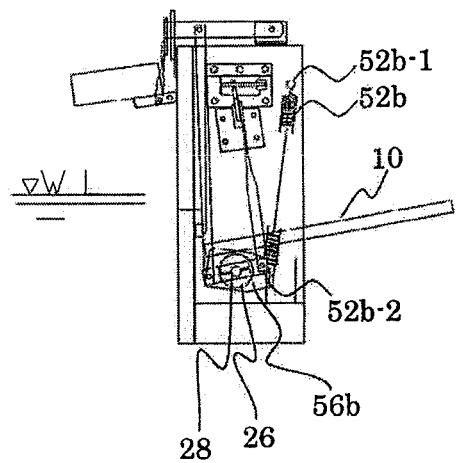
FIGS. 16 (a) and 16(b) show side views of the opening/closing device 1 when the gate 10 is slightly raised, and shows a left side view (FIG. 16(a)) and a right side view (FIG. 16(b)) viewed from the upstream side.
Figure 16A:
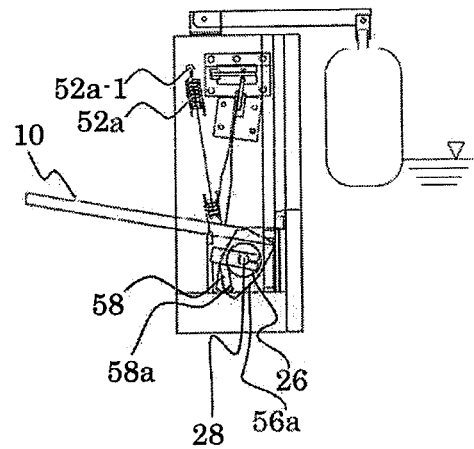

FIG. 16 shows side views of the opening/closing device 1 when the gate 10 is slightly raised, and shows a left side view (FIG. 16(a)) and a right side view (FIG. 16(b)) viewed from the upstream side.

Referring to FIG. 16(a), the distance between the straight line connecting between the one end 52a-1 of the first force generation unit and the other end 58a of the first force generation unit and the center of the gate rotation shaft 26 is still short when the gate 10 is slightly raised. Thus, the torque generated by the first spring 52a for clockwise rotating the gate rotation shaft 26 (torque for raising the gate 10) is still low.

Referring to FIG. 16(b), the distance between the straight line connecting between the one end 52b-1 of the second force generation unit and the other end 52b-2 of the second force generation unit and the center of the gate rotation shaft 26 is still long when the gate 10 is slightly raised. Therefore, the torque generated by the second spring 52b for counterclockwise rotating the gate rotation shaft 26 (torque for raising the gate 10) is still sufficient for raising the gate 10.

The gate 10 is further raised.

Figure 17B:
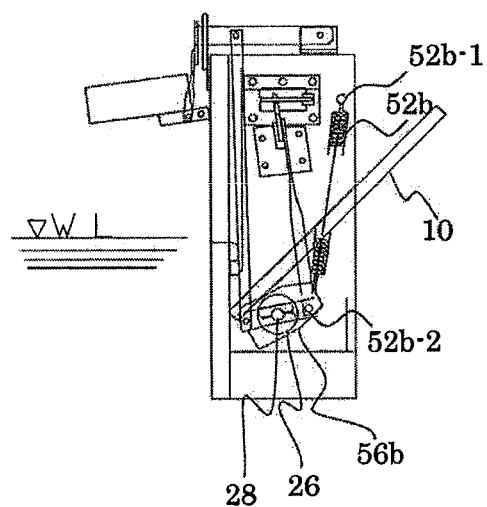
FIGS. 17 (a) and 17 (b) show side views of the opening/closing device 1 when the gate 10 is further raised, and shows a left side view (FIG. 17(a)) and a right side view (FIG. 17(b)) viewed from the upstream side.
Figure 17A:
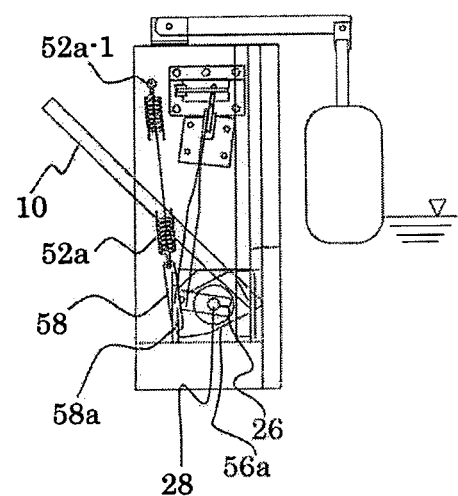

FIG. 17 shows side views of the opening/closing device 1 when the gate 10 is further raised, and shows a left side view (FIG. 17(a)) and a right side view (FIG. 17(b)) viewed from the upstream side.

Referring to FIG. 17(a), a distance D3 between the straight line connecting between the one end 52a-1 of the first force generation unit and the other end 58a of the first force generation unit and the center of the gate rotation shaft 26 is long when the gate 10 falls at a predetermined angle. In other words, the distance D1 between the straight line connecting between the one end 52a-1 of the first force generation unit and the other end 58a of the first force generation unit and the center of the gate rotation shaft 26 when the gate 10 is in the fallen state (refer to FIG. 15(a)) is shorter than the distance D3. It should be noted that this holds true for a case in which the gate 10 falls at an angle less than the predetermined angle (the gate 10 stands more upright than in FIG. 17(a)). Therefore, the first spring 52a generates a force sufficient for bringing the gate 10 into the upright state when the gate 10 falls at an angle equal to or less than the predetermined angle. In other words, the torque generated by the first spring 52a for clockwise rotating the gate rotation shaft 26 (torque for raising the gate 10) is sufficiently high for bringing the gate 10 into the upright state.

Referring to FIG. 17(b), a distance between the straight line connecting between the one end 52b-1 of the second force generation unit and the other end 52b-2 of the second force generation unit and the center of the gate rotation shaft 26 slightly decreases when the gate 10 is further raised. Therefore, the torque generated by the second spring 52b for counterclockwise rotating the gate rotation shaft 26 (torque for raising the gate 10) slightly decreases.

The gate 10 finally returns to the upright state.

Figure 18:
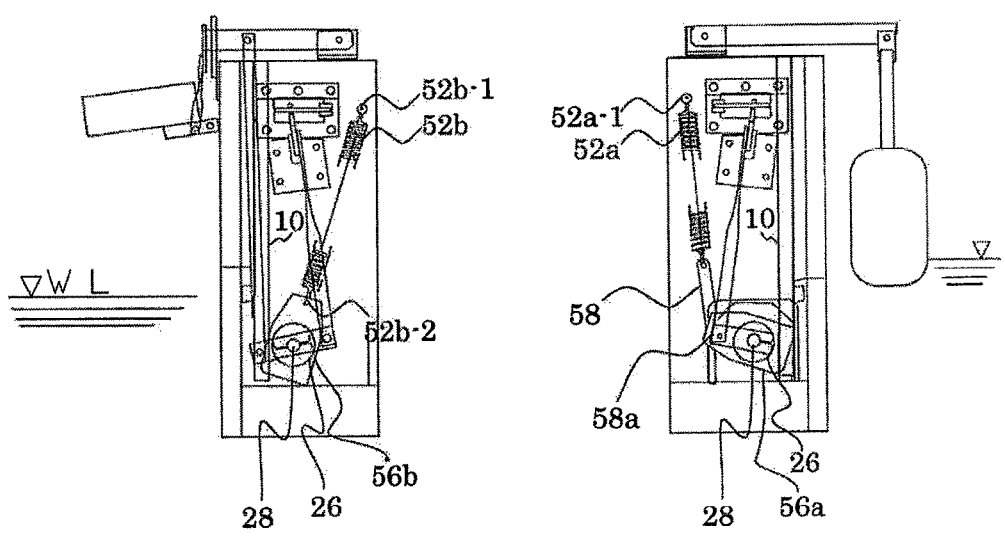
FIGS. 18 (a) and 18 (b) show side views of the opening/closing device 1 when the gate 10 is in the upright state, and shows a left side view (FIG. 18(a)) and a right side view (FIG. 18(b)) viewed from the upstream side.

FIG. 18 shows side views of the opening/closing device 1 when the gate 10 is in the upright state, and shows a left side view (FIG. 18(a)) and a right side view (FIG. 15(b)) viewed from the upstream side.

Referring to FIG. 18(a), the torque generated by the first spring 52a for clockwise rotating the gate rotation shaft 26 is high.

Referring to FIG. 18(b), the gate rotation shaft 26 is present on the straight line connecting between the one end 52b-1 of the second force generation unit and the other end 52b-2 of the second force generation unit, and the torque generated by the second spring 52b for counterclockwise rotating the gate rotation shaft 26 is approximately zero.

According to the embodiment of the present invention, when the gate 10 falls down (refer to FIG. 15(a)), the torque generated by the first spring 52a having the large spring constant for bringing the gate 10 into the upright state is low, and it is possible to prevent the gate 10 from closing when the water level of the flow passage is still high.

Moreover, the first spring 52a generates a force sufficient for bringing the gate 10 into the upright state when the gate 10 falls at an angle equal to or less than the predetermined angle (refer to FIG. 17(a)). Thus, it is possible to bring the gate 10 into the upright state.

Further, when the gate 10 falls down (refer to FIG. 15(b)), and the water level of the flow passage in which the fluid (sewage W) flows is equal to or lower than the predetermined water level, it is possible to start bringing the gate 10 into the upright state by the second spring 52b that is configured to generate the force sufficient for starting bringing the gate 10 into the upright state.

The invention claimed is:

1. An opening/closing device comprising:
   a gate that receives a flow of fluid, and is able to fall down toward a downstream direction of the flow;
   a fall prevention unit that supports the gate, thereby preventing the gate from falling down;
   a support release unit that releases the support for the gate by the fall prevention unit;
   a first float that is arranged on an upstream side of the gate, is arranged on one of the left side and the right side of the gate viewed from upstream, and is less in the specific gravity than the fluid;
   a floating prevention unit that prevents the first float from floating;
   a second float that is arranged on the upstream side of the gate, is arranged on the other one of the left side and the right side of the gate viewed from upstream, and is less in the specific gravity than the fluid; and
   a floating prevention release unit that releases the prevention of the first float from the floating by the floating prevention unit as the second float floats,
   wherein the support release unit is activated as the first float floats.

2. The opening/closing device according to claim 1, wherein the fall prevention unit supports a surface on a downstream side of the gate.

3. The opening/closing device according to claim 1, wherein the support release unit pulls the fall prevention unit toward an outside of the flow, thereby releasing the support for the gate.

4. The opening/closing device according to claim 1, comprising:
   a suspension member that suspends the first float, and includes a portion that ascends as the first float floats; and
   an ascending member that is positioned above the second float, and has a portion that ascends as the ascending portion of the suspension member ascends, wherein the floating prevention unit includes:

an abutting portion that is positioned above the ascending member, and abuts against the ascending member when the ascending portion of the ascending member ascends; and a fixing portion that rotatably fixes the abutting portion to a portion that is stationary with respect to the flow.

5. The opening/closing device according to claim 4, wherein:

the floating prevention unit includes a rotatable portion that is able to rotate about the fixing portion;

moreover, the abutting portion rotates by an angle by which the rotatable portion rotates; and the floating prevention release unit includes a drive unit that moves the rotatable portion as the second float floats.

6. The opening/closing device according to claim 4, comprising a descending portion that is coupled to the suspension member, and descends as the ascending portion of the suspension member ascends, wherein:

the support release unit pulls the fall prevention unit toward an outside of the flow, thereby releasing the support for the gate; and further, the support release unit is coupled to the descending portion, and pulls the fall prevention unit toward the outside of the flow in response to a descent of the descending portion.

7. The opening/closing device according to claim 4, wherein the ascending member and the suspension member are coupled to each other via a rotation shaft extending in the same direction as a rotation center of the gate.

8. The opening/closing device according to claim 7, wherein:

the floating prevention unit includes a rotatable portion that is able to rotate about the fixing portion;

moreover, the abutting portion rotates by an angle by which the rotatable portion rotates; and the floating prevention release unit includes a drive unit that moves the rotatable portion as the second float floats.

9. The opening/closing device according to claim 7, comprising a descending portion that is coupled to the suspension member, and descends as the ascending portion of the suspension member ascends, wherein:

the support release unit pulls the fall prevention unit toward an outside of the flow, thereby releasing the support for the gate; and further, the support release unit is coupled to the descending portion, and pulls the fall prevention unit toward the outside of the flow in response to a descent of the descending portion.

* * * * *